United States Patent
Gorelik et al.

(10) Patent No.: US 6,317,737 B1
(45) Date of Patent: Nov. 13, 2001

(54) DATA DESCRIPTIONS IN A DATABASE SYSTEM

(75) Inventors: Vladimir Gorelik, Palo Alto; Craig R. Powers, San Carlos; John E. Zicker, Portola Valley; Nicholas F. Engelhardt, San Jose, all of CA (US)

(73) Assignee: Sagent Technologies, Inc., Palo Alto, CA (US)

( * ) Notice: Subject to any disclaimer, the term of this patent is extended or adjusted under 35 U.S.C. 154(b) by 0 days.

(21) Appl. No.: 08/951,092

(22) Filed: Oct. 17, 1997

Related U.S. Application Data

(60) Provisional application No. 60/028,640, filed on Oct. 18, 1996.

(51) Int. Cl.[7] .................................................. G06F 17/30
(52) U.S. Cl. .............................. 707/3; 707/100; 345/334; 345/335; 705/30
(58) Field of Search ................. 707/2, 10, 102, 707/202, 4, 3, 100, 1; 345/334, 335; 705/30

(56) References Cited

U.S. PATENT DOCUMENTS

| | | | |
|---|---|---|---|
| 5,471,629 | * 11/1995 | Risch | 395/800 |
| 5,485,369 | 1/1996 | Nicholls et al. | 707/9 |
| 5,485,610 | * 1/1996 | Gioielli et al. | 707/102 |
| 5,564,044 | 10/1996 | Pratt | 395/676 |
| 5,566,330 | 10/1996 | Sheffield | 707/4 |
| 5,596,744 | * 1/1997 | Dao et al. | 707/10 |
| 5,627,959 | * 5/1997 | Brown et al. | 345/356 |
| 5,634,053 | * 5/1997 | Noble et al. | 707/4 |
| 5,717,925 | * 2/1998 | Harper et al. | 707/102 |
| 5,732,258 | * 3/1998 | Jakobsson et al. | 707/4 |
| 5,734,896 | * 3/1998 | Rizvi et al. | 707/202 |
| 5,737,736 | * 4/1998 | Chang | 707/102 |
| 5,745,895 | * 4/1998 | Bingham et al. | 707/10 |
| 5,752,018 | 5/1998 | Sheffield | 707/2 |
| 5,761,654 | * 6/1998 | Tow | 707/2 |
| 5,832,481 | 11/1998 | Sheffield | 707/4 |
| 5,873,083 | * 2/1999 | Jones et al. | 707/4 |

(List continued on next page.)

OTHER PUBLICATIONS

Shu, N.C. et al., "Express: A Data EXtraction, Processing, and REStructing System", *ACM Transactions on Database Systems*, vol.2, No. 2, Jun. 1977, pp. 134–174.

Shu, N.C., et al. "Convert: A High Level Translation Definition Language for Data Conversion", *Communications of the ACM*, vol. 18, No. 10, Oct. 1975, pp. 557–567.

Lum, V. Y. et al., "A General Methoology for Data Conversion and Restructuring", *IBM J. Res. Develop.*, Sep. 1976, pp. 483–497.

Birss, Edward W. et al., "Generalized software for translating data", AFIPS Conference Proceedings, 1976 National Computer Conference, Jun. 7–10, 1976 New York, NY, pp. 889–897.

Rin, N. Adam et al., "An Overview of a System for Automatic Generation of File Conversion Programs", *Software —Practice and Experience*, vol. 5, John Wiley & Sons, Ltd. (1975), pp. 193–202.

Zloof, M. et al., "The System for Business Automation (SBA): Programming Language", *Communications of the ACM*, vol. 20, No. 6, Jun. 1977, pp. 385–396.

*Primary Examiner*—John Breene
*Assistant Examiner*—Cheryl Lewis
(74) *Attorney, Agent, or Firm*—Blakely, Sokoloff, Taylor & Zafman LLP

(57) ABSTRACT

One embodiment of the invention includes data descriptions of data in a database. The data descriptions include baseviews and metaviews. The baseviews reference specific portions of the actual database schema while the metaviews provide descriptions of baseviews. Each baseview includes specific references to specific columns in tables stored in the database.

20 Claims, 1 Drawing Sheet

Figure 1:
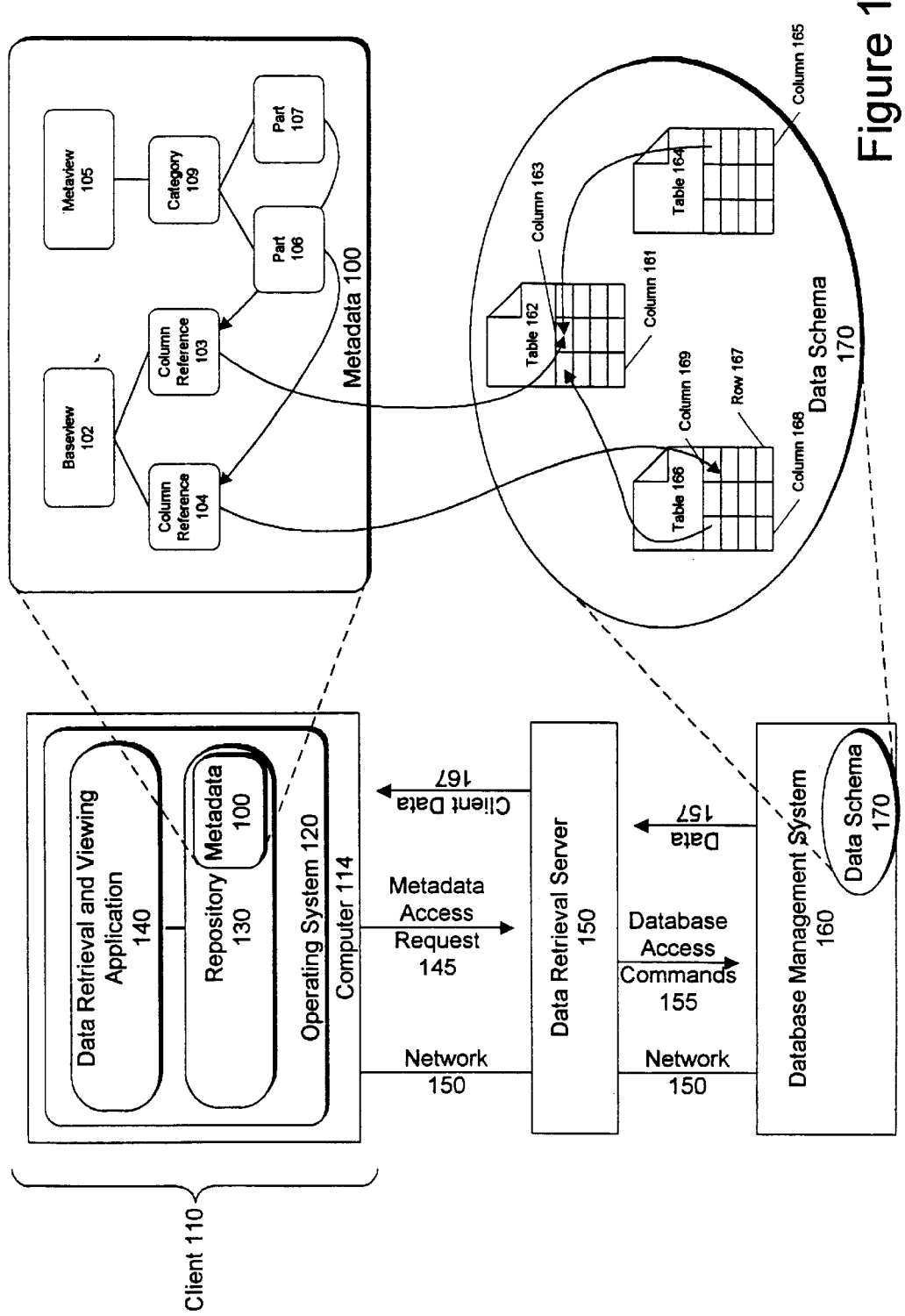

U.S. PATENT DOCUMENTS 5,881,378 * 3/1999 Hayashi et al. .................... 707/100
5,920,856 * 7/1999 Syeda-Mahmood ................ 707/3
5,940,820 * 8/1999 Kagiwada .......................... 707/3
5,966,707 * 10/1999 Van Huben et al. ............... 707/10
5,999,908 * 12/1999 Abelow .............................. 705/1

* cited by examiner

DATA DESCRIPTIONS IN A DATABASE SYSTEM

RELATED APPLICATIONS

This application relates to, and incorporates by reference, the following applications:

"Data Descriptions in a Database System," having the inventors Vladimir Gorelik, Craig R. Powers, John E. Zicker, and Nicholas F. Engelhardt, having Ser. No. 60/028,640, and filing date Oct. 18, 1996;

"Database Repository With Deferred Transactions," having the inventors Craig R. Powers, Terris, J. Linenbach, Vladimir Gorelik, Tana C. Netsch, Robert E. Powers, and having U.S. Pat. No. 5,930,794 and filing date Nov. 26, 1996; and, "Extensible Database Retrieval and Viewing Architecture," having the inventors of Craig R. Powers, and Vladimir Gorelik having Ser. No. 60/028,725, and filing data Oct. 18, 1996.

BACKGROUND OF THE INVENTION

Datamarts are types of software programs that allow users to aggregate, sort, sift, and manipulate data from a number of sources. These sources of data can be, for example, databases or internet web servers. Users describe the types of data they wish the datamarts to access, from which source, and how that data should be manipulated. The users use data descriptions to access the data from these sources.

In some systems, the data descriptions include the actual instructions that access the specific source. For example, the data descriptions might includes an SQL language instruction to access a specific database. The problem with these types of data descriptions are that they are very data source specific. For example, if a data description works for one type of SQL database, this same description will not work to access the same data in a different type of database. The data description will have to be translated into an instruction for the other type of database.

Therefore, what is needed is an improved data description mechanism that can be used to access data independently from the source. Also, what is needed is a system that supports such data descriptions.

SUMMARY OF THE INVENTION

One embodiment of the invention includes data descriptions of data in a database. The data descriptions include baseviews and metaviews. The baseviews reference specific portions of the actual database schema while the metaviews provide descriptions of baseviews. Each baseview includes specific references to specific columns in tables stored in the database.

Importantly, in one embodiment, the baseviews do not include database access commands to access the specific columns of the database. Without the database access commands in the baseviews, baseviews and metaviews are much more independent of the underlying database interface. In this embodiment, an application requests a server to prepare database access commands using the metaviews references' to baseviews, and the baseviews' references to specific columns of tables in the database.

A BRIEF DESCRIPTION OF THE DRAWINGS

The figures illustrate the invention by way of example, and not limitation. Like references indicate similar elements.

FIG. 1 illustrates a system including a metadata representation of data in a database.

DETAILED DESCRIPTION OF THE INVENTION a. Database System

FIG. 1 illustrates a system including a metadata representation of data in a database. The following first lists the elements in FIG. 1 and then describes each of the elements.

FIG. 1 includes a database management system 160, a data retrieval server 150, and a client 110. The database management system 160 includes data organized according to data schema 170. The data schema includes data organized into three tables, table 162, table 164 and table 166. Each table includes a number of columns and rows. For example, the table 162 includes column 161 and column 163, and table 164 includes column 165, and table 166 includes column 168, column 169, and row 167. The client 110 includes a computer 114. The computer 114 includes an operating system 120, a repository 130, and a data retrieval and view application 140. The repository 130 includes metadata 100. The metadata 100 includes a baseview 102, a metaview 105, a column reference 103, a column reference 104, a category 109, a part 106 and a part 107. The client 110 communicates over the network 150 with the data retrieval server 150 and then consequently the database management system 160.

The following describes the data entry and storage systems of FIG. 1. The database management system 160 stores data and allows users to manipulate that data through a connection to that database management system 160. The data retrieval server 150 allows clients 110 to retrieve and view portions of the data in the database management system 160. In one embodiment, the database management system 160 includes a data warehouse where vast amounts of data is consolidated and fed to smaller data warehouses (called data marts). In the example system of FIG. 1, the data warehouse functions are performed by the database management system 160 while the data mart functions are performed by the database management system 160. Oracle Corporation, of Redwood Shores, Calif., provides data warehouse systems.

In one embodiment, the data retrieval server 150 resides on a computer separate from the client 110. Other embodiments of the invention support other hardware and software configurations, such as the data retrieval server 150 and the database management system 160 sharing the same database management system (e.g., a database system from Oracle, Inc. of Redwood Shores, Calif.). In this embodiment, the client 110 uses the data retrieval server 150 for the storage functions of the repository 130.

In the example of FIG. 1, the database management system 160 includes the data organized according to the data schema 170. The data schema 170 defines how the data is organized in a database (e.g., which tables include which columns and how the columns from different tables relate). In the example of FIG. 1, table 162 includes column 161 corresponding to column 168 of table 166 and column 163 corresponding to column 165 of table 164. However, all these columns and relations are not always needed by all users. One embodiment of the invention allows user to easily select and use a subset of the information.

The following describes the client 110 in greater detail. The client 110 includes a computer 114. Various computers 114 used in various embodiments of the invention include IBM-PC compatible computers, Macintosh™ computers, and workstations from Sun Microsystems, Inc., Hewlett-Packard and Silicon Graphics, Inc.

The client's 110 operating system 120 includes the Windows NT™ operating system. Other embodiments of the invention use other operating systems, such as Unix, Max OS™, and Windows 3.1™.

The following describes the data retrieval and viewing features of the client 110. The data retrieval and viewing application 140 causes the data retrieval server 150 to access data from the database management system 160 using a plan. That is, the application 140 sends a metadata access request 145 to the data retrieval server 150. The data retrieval server 150 generates one or more database access commands 155 (e.g., an SQL query or other database access language query) from the metadata access request 145. The database access commands 155 cause the database management system 160 to return data 157 to the data retrieval server 150 that corresponds to the database access commands 155. The data retrieval server 150 then provides the client 110 with the client data 167.

To aid in building a plan, one embodiment of the invention allows the user to describe portions of the data schema 170 in a more user friendly manner. (The data schema 170 can be very large and complicated.) The metadata 100 is that user friendly description. The metadata 100 is data about the data in the database management system 160. The metadata 100 allows the user to reference only portions of the data schema 170 and organize those portions in a more application specific manner than is available from the database management system 160. This allows users to more easily develop plans for special groups. For example, the metadata 100 can reference only those portions of the data schema 170 that is most interesting to an accounting department.

The metadata 100 includes baseviews and metaviews. The baseview mirrors the portions of the data schema 170 and thereby populates the server 150. To create a baseview, the user specifies which database to access and which tables to use. Metaviews are a logical metadata layers built on top of one or more baseviews. The metaviews hide the complexity of the data schema 170 and provide users with a view of the data that more closely matches the user's business needs and vocabulary. To create a metaview, a user specifies which portions of one or more baseviews are to be referenced within one metaview.

As noted above, the baseview provides a description of a portion of the data schema 170. This is accomplished by having the baseview include specific references to specific columns in the data schema 170. For example, the baseview 102 includes a column reference 104 that corresponds to column 169 of table 166 and a column reference 103 that corresponds to column 163 of table 162. Each column reference corresponds to a specific table and column in the data schema 170. In one embodiment, each baseview includes table references that reference specific tables in the data schema 170. Each table then includes column references, each column reference referencing a specific column in that table.

In one embodiment, the baseviews support table alias. This allows the baseview to include alternative joins than found in the data schema 170.

In one embodiment of the invention, the baseview can also include joins between tables in the baseview. The joins need not explicitly exist in the data schema 170.

The metaview allows the user to logically group data referenced in the baseviews. The metaviews use categories and parts. The categories provide a logical subgrouping of related parts. A part can be either simple or computed. In the example of FIG. 1, part 106 and part 107 are included in the same category 109, which provides a logical subgroup for the two parts. A simple part maps to a single column in the baseview. For example, part 106 maps only to column reference 104 while part 107 maps only to column 103. A computed part represents a number of columns which are combined into a computational expression (e.g., column X plus column Y). Computed parts expressions can also contain other parts from the same metaview in the expression which allows the user to reuse the expression in multiple places. A part can also contain an optional constraint such that whenever the part is used in a query, the result is always constrained by that part's constraint. Parts can have multiple names: one global name which is seen by all the users as well as a private name which a user can give to a part that is only visible by that user.

In one embodiment, the metaviews can also include join groups. Join groups are predefined join paths through the data schema 170 between two or more joined tables. The data retrieval server 150 uses the join group to prepare a query to reference the two joined tables. If a join group does not exist for all the tables in a query, then the data retrieval server 150 dynamical generates the join group.

In one embodiment of the invention, the baseview only includes column references and each column reference can only specify one column of one table. In particular, in this embodiment, the baseview cannot specify a group of columns (e.g., using an SQL command to select a group of columns from a table). This apparent limitation is compensated for by the metaviews and provides the embodiment with great flexibility. Because the baseviews do not include the specific SQL commands, the data retrieval and viewing application 140 is completely independent of the underlying database management system's 160 interface. Therefore, without having to understand the database management system's 160 interface, the user can use baseviews that reference data from multiple, and potentially very different, database management systems 160. Additionally, many changes made to the access interface of the database management system 160 need only be addressed in the data retrieval server 150 and not in the plans, metaviews or baseviews.

b. Example of Metaview and Baseview Use

Assume that the chief financial officer (CFO) of a company frequently uses data in a large inventory tracking database, data from an accounting database and data from a marketing database. Assume that by combining data from each of the databases in a number of ways, new insight can be gained. The CFO can easily access and combine the information using one embodiment of the invention.

First a user, not necessarily the CFO, defines baseviews that references the specific columns in the specific databases that the user is likely to want to access. For example, a first baseview can include column references for the product ID and the current amount of stock from the inventory database. A second baseview can include column references for the product IDs, the cost of the products to the company, and the current sales price of the products from the accounting database. A third baseview can include column references for the product IDs, the number of products sold per country in the last year, each product's category, and six month forecasts for sales of products from different categories from the marketing database. The baseview would also include the joins for each database.

The user can then create metaviews that logically group the data from different baseviews. For example, one metaview for the CFO might include a category for revenue estimating that would include parts for the forecast, product category, product ID and product price columns.

The parts are now available for use by the CFO in a plan. The plan defines a specific set of transformations to perform on data in the database. To determine how much money the company can expect to make in the next quarter, the CFO uses the application 140 to access the parts in the revenue estimating category as inputs to a plan that estimates revenue for a particular product category over a given period of time. The plan can even include a step to sort the output.

Once the plan is created, the CFO uses the application 140 to request that the plan be executed by the data retrieval server 150. As part of executing the plan, the data retrieval server 150 follows the links from the parts to the column references to determine the specific columns of the specific tables in the data schema 170. Once identified, the data retrieval server 150 can generate the necessary database access commands 155 to access those columns and request the corresponding data 157. The data 157 is then manipulated by the steps in the plan to generate the desired results. These results can then be provided back to the client, as the client data 167, for viewing by the CFO.

Thus, one embodiment of the invention that includes data descriptions of data in a database has been described.

c. Additional Description

The following documents are incorporated herein by reference.

i. Appendix A includes a new users introduction guide entitled, "Information Studio, Getting Started," further describing embodiments of the invention.

ii. Appendix B includes an additional users guide entitled, "Design Studio, User's Guide," further describing embodiments of the invention.

iii. Appendix C includes an administrators guide entitled, "Sagent Data Mart, Administrator's Guide," further describing embodiments of the invention.

iv. Appendix D includes source code for a query engine of the server 150 that generates queries from the plans.

What is claimed is:

1. A method of accessing data in a data source using a computer system:

accessing a metaview, the metaview referencing one or more baseviews, the metaview not including a reference to the schema of said data source;

accessing each of the one or more baseviews, said each of the one or more baseviews not including a data source specific instruction for accessing said data from said data source, said each of the one or more baseviews including at least a reference to the schema of said data source; and retrieving the data from the data source using said each of the one or more baseviews by generating a data source specific instruction from said each of the one or more baseviews and transmitting said data source specific instruction to the data source.

2. The method of claim 1 wherein the metaview defines a group of data descriptions, said each of the one or more baseviews being in said group of data descriptions, said group of data descriptions representing a group of data representing a business query.

3. The method of claim 2 wherein the business query corresponds to revenue estimation.

4. The method of claim 1 wherein the metaview corresponds to a part, wherein the part corresponds to any of the one or more baseviews.

5. The method of claim 4 wherein the part is a simple part.

6. The method of claim 4 wherein the part is a computed part, the computed part representing a combination of a plurality of columns into a computational expression.

7. The method of claim 4 wherein the part has constraint such that when the part is used in a query, the result is constrained by the part's constraint.

8. The method of claim 1 wherein the metaview corresponds to a join group, wherein the join group defines paths to join at least portions of at least two or more tables from the data source.

9. The method of claim 8 wherein if the join group does not exist at the time of a query, the computer system automatically creates the join group.

10. The method of claim 1 wherein each of the one or more baseviews includes a column reference corresponding to a column of a table in the data source.

11. The method of claim 1 wherein any of the one or more baseviews includes a table alias representing a join not found in the data source.

12. A system for accessing data comprising:

a first database having data arranged according to a first schema;

a second database having data arranged according to a second schema;

a data retrieval system storing data from the first database and the second database;

a computer having a program storing references to at least a first metaview and a set of baseviews, the metaview referencing the set of baseviews while not including a reference to any of the first schema and second schema, the set of baseviews describing the location of first data in the first schema and the location of second data in the second schema, the program for causing a data source specific instruction to be generated to retrieve data from the data retrieval system that corresponds to the metaview.

13. The system of claim 12 wherein the program stores a reference to a second metaview, the second metaview corresponding to a simple part, wherein the simple part corresponds to a first baseview in the set of baseviews.

14. The system of claim 13 wherein the simple part has a constraint such that when the part is used in a query, the result is constrained by the constraint.

15. The system of claim 12 wherein the first metaview corresponds to a computed part using a first baseview and a second baseview from the set of baseviews in a combination of data corresponding to the first schema and the second schema.

16. The system of claim 12 wherein the first metaview corresponds to a join group, wherein the join group defines paths using a first baseview and a second baseview from the set of baseviews to join data corresponding to the first schema and the second schema.

17. The system of claim wherein if the join group does not exist at the time of a query, the computer automatically creates the join group.

18. The system of claim 5 wherein a first baseview in the set of baseviews includes a column reference corresponding to a column of a table in the first data source.

19. A system comprising:

means for accessing a metaview, the metaview referencing one ore more baseviews, the metaview not including references to the schema of said data source;

means for accessing each of the one or more baseviews, said each of the one or more baseviews not including a data source specific instruction for accessing said data from said data source, and said each of the one or more baseviews including at least a reference to the schema of said data source; and means for retrieving the data from the data source using said each of the one or more baseviews by generating a data source specific instruction from said each of the one or more baseviews and transmitting said data source specific instruction to the data source.

20. A computer readable medium that provides instructions, which when executed on a processor, cause said processor to perform operations comprising:

accessing a metaview, the metaview referencing one or more baseviews, the metaview not including a reference to the schema of said data source;

accessing each of the one or more baseviews, said each of the one or more baseviews not including a data source specific instruction for accessing said data from said data source, said each of the one or more baseviews including at least a reference to the schema of said data source; and retrieving the data from the data source using said each of the one or more baseviews by generating a data source specific instruction from said each of the one or more baseviews and transmitting said data source specific instruction to the data source.

* * * * *